Feb. 6, 1968  V. C. JOHNSON  3,367,032
KEYWAY AND LIKE GAGE
Filed April 24, 1967
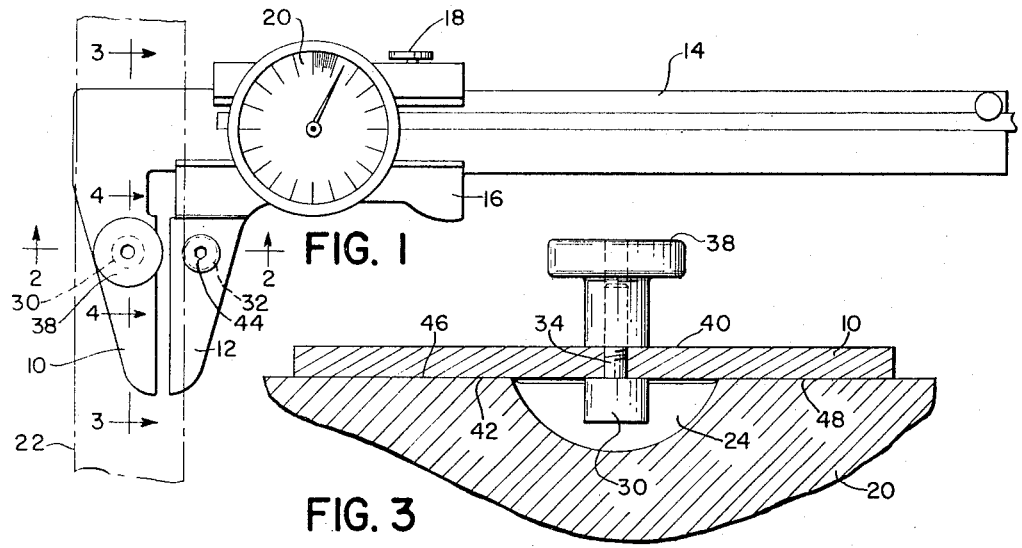
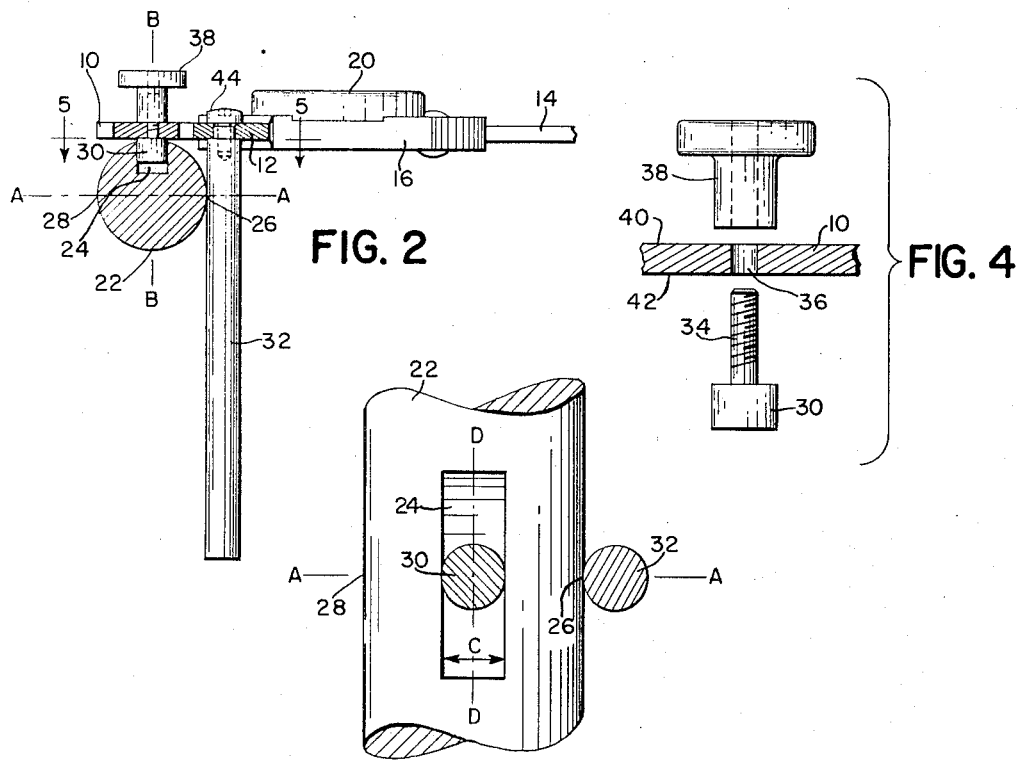
INVENTOR.
VICTOR C. JOHNSON United States Patent Office 3,367,032
Patented Feb. 6, 1968

3,367,032
KEYWAY AND LIKE GAGE
Victor C. Johnson, 1019 Brady St.,
Davenport, Iowa 52803
Filed Apr. 24, 1967, Ser. No. 633,237
6 Claims. (Cl. 33—143)

ABSTRACT OF THE DISCLOSURE

A gage or measuring tool, preferably of the vernier caliper type, having specially designed elements fixed respectively to the jaws thereof for use in determining and comparing the diametric distances between opposite sides of a shaft or the like and a keyway, bore, etc. specified to be centrally located between said sides and to have a prescribed width.

Background of the invention

Gages, measuring and checking devices and systems are as old as the art of machine tools but, so far as is known, no gage or system has been previously devised for readily determining the accuracy, or central symmetry, of a keyway, bore or other regular cavity relative to, say, the diametrically opposite sides of a shaft of circular section or its equivalent. Keyways have been especially difficult to check for they may vary not only as to central location but may be askew lengthwise of the shaft. Checking operations of this general character, by way of inspection methods, have been previously performed by complicated systems of height gages, blocks and other complicated arrangements using a variety of tools, gages and related impedimenta. The problem becomes particularly acute when shafts vary as to diameter, keyway widths and lengths and related keyways and/or bores along the shaft etc.

Summary of the invention

Briefly, and specifically, the above problems are solved by a single, easily manipulated tool having relatively movable jaws, one of which carries an anvil adapted to tolerably fit the keyway, etc. and the other of which carries a gaging element adapted to contact, in sequence, first one and then the other of diametrically opposed sides of the member with respect to which the keyway or other cavity is specified to be not only centrally located but also parallel to the two sides. As to shafts having keyways of a specified width, the anvil is designed to fit the keyway tightly so as to eliminate lateral play, and it is a simple matter to insert the anvil into the keyway, bring the other element into contact with one side of the member, measure the distance, reverse the tool, again inserting the anvil into the keyway, bringing the element into contact with the opposite side of the member, measuring the lateral distance and comparing the two distances. If these are equal or nearly so according to specification, the shaft is determined to be acceptable in the respect gaged. When shafts with larger or smaller keyways are to be checked, the anvil is removed and replaced with a new one fitting the new keyway. By checking lengthwise of the member, the parallelism of the keyway can be determined. In a broader sense, the tool is useful for checking symmetry of bores and other cavities of regular configuration, and even lengthwise spaced portions of irregular cavities where it is important that certain portions thereof be symmetrical as to centerline or disposition on a radius of the shaft normal to the diameter on which the opposite sides of the shaft are opposed.

Description of the drawings

FIGURE 1 is a plan of the tool, shown with a shaft in broken lines;

FIGURE 2 is a section as seen along the line 2—2 of FIGURE 1;

FIGURE 3 is an enlarged section as seen along the line 3—3 of FIGURE 1;

FIGURE 4 is an enlarged exploded view of the anvil as seen along the line 4—4 of FIGURE 1; and FIGURE 5 is an enlarged section as seen along the line 5—5 of FIGURE 1.

Description of the preferred embodiment

The principles and advantages of the invention are best derived from a modified form of conventional vernier caliper having first and second interconnected relatively movable jaws 10 and 12, the former being integral with an elongated leg 14 along which the second jaw is slidably adjustable lengthwise via a slide 16 forming part of the second jaw. The position of the slide 16, and consequently of the second jaw relative to the first jaw 10, can be fixed by a stop screw 18. Distances between the two jaws may be conventionally read along a longitudinal scale (not shown) along the lower edge of the leg 14 as well as on a dial 20 carried by the slide 16, also conventional.

A shaft 22, representative of an equivalent member, which may also be a rod, bar or the like, has a keyway 24 therein, here representative of an equivalent cavity that may include a through-bore, a blind bore etc. The original specifications for the shaft and keyway are assumed to require that the keyway be centrally located between opposite sides 26 and 28 of the member that lie on a diameter extended A—A. Additionally the keyway is prescribed to be perpendicular to the line A—A; i.e., to lie on an axis B—B, which is a perpendicular diameter extended as respects the line or diameter extended A—A. Further, the keyway should have a prescribed width C (FIGURE 5) and this should be symmetrical on a line D—D that lies in a plane including the main axis of the shaft 22 and the line B—B. In short, opposite elongated sides of the keyway should be parallel (or tolerably so) to the opposite sides 26 and 28 of the shaft. In the case of a bore, whether radial or diametrical, its axis should be a radius or diameter of the shaft that is perpendicular to the line A—A, meaning that it will be exactly centered between the opposite sides of the shaft. The foregoing is described in terms of a shaft of circular section, but it will be readily seen that the general geometry employed will fit other and equivalent situations.

The measurement and comparison of the distances between th keyway 24 and the opposite sides of the shaft, for determining its symmetry, becomes relatively easy, according to the invention, by the provision on the jaws 10 and 12 of an anvil 30 and contact element or rod 32 respectively. The anvil 30 is preferably a member of circular cross section having a fixed dimension tolerably equal to the width C of the keyway 24 and is rigidly affixed to the jaw 10 by the provision of an integral coaxial stud part 34 which is externally threaded and passes through an accommodating hole or aperture 36 in the jaw, receiving a nut 38 which is tightly screwed down against the top 40 of the jaw 10, this top being the face opposite the undersurface 42 of the jaw, to which further reference will be made below, and against which the shouldered junction between 30 and 34 abuts. When keyways of width different from that shown are to be checked, the anvil 30 may be easily removed and replaced with one of appropriate diameter (transverse dimension), it being understood that the replacement anvil will have a stud part similar to the part 34 so that the nut 38 may be re-used. The advantage in forming the anvil 30 as a cylinder will be seen in that its rotative position about its axis will not affect its transverse dimension and it need not be specially located, as would an anvil of non-circular shape. So long as the anvil relatively tightly fits the keyway, lateral play is avoided, along with its consequent inaccuracy.

The element or rod 32 is also preferably cylindrical and rigidly but removably attached to the jaw 12, as by means of a recessed-head screw 44, so as to be replaceable with equivalent rods of different lengths and diameters in order to accommodate shafts of different diameters. It will be seen that if the diameter of the element 32 is increased, it will present a surface portion closer to the anvil, and that when longer elements are used, they can reach points similar to 26 and 28 on shafts of larger diameter. This further points up the versatility of the tool.

From FIGURE 3 it will be seen that the jaw 10 has a substantial width relative to the length of the keyway, thereby enabling its under surface 42 to contact the shaft at portions 46 and 48 axially well beyond the length of the keyway in both directions lengthwise of the shaft. This avoids taking measurements at portions of the shaft from which metal has been removed arcuately by the formation of the keyway, it being clear that measuring from the relieved portion would multiply inaccuracies. Thus the undersurface 42 of the jaw 10 lies theoretically tangent to the top cylindrical portion of the shaft apart from the keyway and the anvil projects from this surface, again theoretically, on an axis coincident with the radius that is coincident with the line B—B. The expression "theoretically" is used with reference to a perfect situation in which complete coincidence is obtained throughout; i.e., the keyway or its equivalent is formed perfectly as to center and its main axis (upright as viewed in the drawings) is vertical to the horizontal line A—A. Further, the keyway, from end to end is also perfect.

In the use of the tool or instrument, the anvil 30 is selected as to diameter to correspond to the prescribed keyway width, with a tolerance of, say, plus zero and minus .002". The tool is applied to the shaft transversely to the length of the shaft (FIGURES 1 and 2), with the anvil fitting the keyway. The jaw 12 is brought toward the shaft from one side until the element 32 contacts the shaft at 26. The distance is measured on the scale and dial as in the conventional vernier caliper. The tool is then reversed, the anvil again being received in the keyway and the jaw 12 brought up until the element 32 contacts the shaft at 28. The distance is again measured. The two measurements are compared. If they are equal, the keyway is centered; of course, accepted tolerances may be allowable. Since the anvil does not reach to the maximum depth of the keyway, several—say three— measurements may be taken at each side of the shaft, the keyway has the accepted parallelism.

The foregoing applies of course to the checking of radial or diametrical bores and equivalent cavities, with the exception that in the case of bores there is no lengthwise parallelism to ascertain.

The advantage of the fixed-dimension anvil is that, since it fits the keyway, it automatically has the same centerline as the keyway and this eliminates measuring between different portions of the sides or walls of the keyway, which may vary within the length of the keyway. Features and advantages other than those enumerated will occur to those versed in the art, as will many alterations in the preferred embodiment disclosed, all without departure from the spirit and scope of the invention.

I claim:

1. A tool for checking the transverse distances between diametrically opposite sides of a member such as a shaft and the like having a cavity therein and a member-containd cavity such as a keyway, bore and the like specified to be located centrally between said sides on an axis perpendicular to said member diameter on which said sides are opposed to each other and to have a prescribed transverse dimension and depth, comprising: first and second jaws interconnected for relative adjustment along a defined path transversely of the member, said first jaw having a flat under surface of such dimension lengthwise of the member as to be capable of lying flat against the member at portions thereof lengthwise beyond and at opposite sides of the cavity; an anvil uniform in cross-section throughout its length rigid on and depending perpendicularly from the first jaw and having a fixed transverse dimension equal to that of the cavity such as to be relatively tightly receivable in the cavity and further having a fixed length less than the depth of the cavity; and an element rigid on and depending from the second jaw in parallelism with the anvil and bi-positionally adapted, when the anvil is received in the cavity, to selectively engage said opposite sides of the member so that the distances between the cavity-received anvil and the member-contacting element in the two positions of the latter may be compared.

2. The invention defined in claim 1 in which the anvil is removable from the first jaw for interchange with similar anvils of different dimensions to respectively fit other cavities.

3. The invention defined in claim 1, in which the anvil is a cylinder to provide said fixed dimension and said fixed length and has a coaxial integral stud part of reduced diameter, said first jaw having an opening therein relatively tightly receiving said stud part, and means is cooperative between said part and said first jaw to rigidly mount the anvil.

4. The invention defined in claim 3, in which said stud part is externally threaded and said last-named means includes a nut threaded onto said part and engaging the first jaw at the side thereof opposite to that from which the anvil projects.

5. The invention defined in claim 1, in which the element and anvil lie on parallel axes and the element is several times longer than the anvil so as to accommodate members of different dimensions.

6. The invention defined in claim 1, in which the element is removably carried by the second jaw.

References Cited

UNITED STATES PATENTS

| 1,888,416 | 11/1932 | Williams. |
| 2,599,180 | 6/1952 | Hubbs. |
| 2,807,091 | 9/1957 | Michelson. |
| 3,158,941 | 12/1964 | Komstadius. |
| 3,289,307 | 12/1966 | Kelly. |

FOREIGN PATENTS

| 1,376,464 | 9/1964 | France. |

HARRY N. HAROIAN, *Primary Examiner.*